United States Patent [19]

Kuchar

[11] Patent Number: 4,704,816
[45] Date of Patent: Nov. 10, 1987

[54] ICE FISHING TIP-UP APPARATUS

[76] Inventor: Dennis W. Kuchar, Rural Rte. 2 (Box 200), Madison, Nebr. 68748

[21] Appl. No.: 28,220

[22] Filed: Mar. 20, 1987

[51] Int. Cl.$^4$ .......................................... A01K 97/12
[52] U.S. Cl. ...................................................... 43/17
[58] Field of Search ........................................... 43/17

[56] References Cited

U.S. PATENT DOCUMENTS

| 2,136,864 | 11/1938 | Paquette | 43/17 |
| 2,496,090 | 1/1950 | Grohs | 43/17 |
| 3,187,456 | 6/1965 | Apitz | 43/17 |
| 3,727,342 | 4/1973 | Lindsey | 43/17 |
| 4,373,287 | 2/1983 | Grahl | 43/17 |
| 4,567,686 | 2/1986 | Akom | 43/17 |

Primary Examiner—Gene P. Crosby
Attorney, Agent, or Firm—George R. Nimmer

[57] ABSTRACT

Readily erectable, operationally reliable, and nestably transportable ice fishing tip-up apparatus includes three structurally interchangeable and uniquely apertured channel members alternatively designatable as alpha-member, beta-member, and gamma-member. The alpha-member and beta-member are adjustably pivotably joined in parallel horizontal planes, and the gamma-member is pivotably joined in an angularly inclinable relationship to the beta-member. An omega-shaped prop member, which is pivotably attached to the beta-member, can engage an underlying stop member of the inclined gamma-member. A fishing line reel is attached in flanking relationship to the gamma-member with an axle that can also function as the stop member. An elongate lever, which medially surrounds a fulcrum terminus of the gamma-member, includes a relatively shorter and slidably weighted leadward-arm that abruptly falls whenever a fish is caught at the fishing line. The elongate lever also includes a relatively lengthier trailward-arm that automatically abruptly raises in signal-like fashion just as a caught fish causes the weighted leadward-arm to abruptly fall.

10 Claims, 10 Drawing Figures

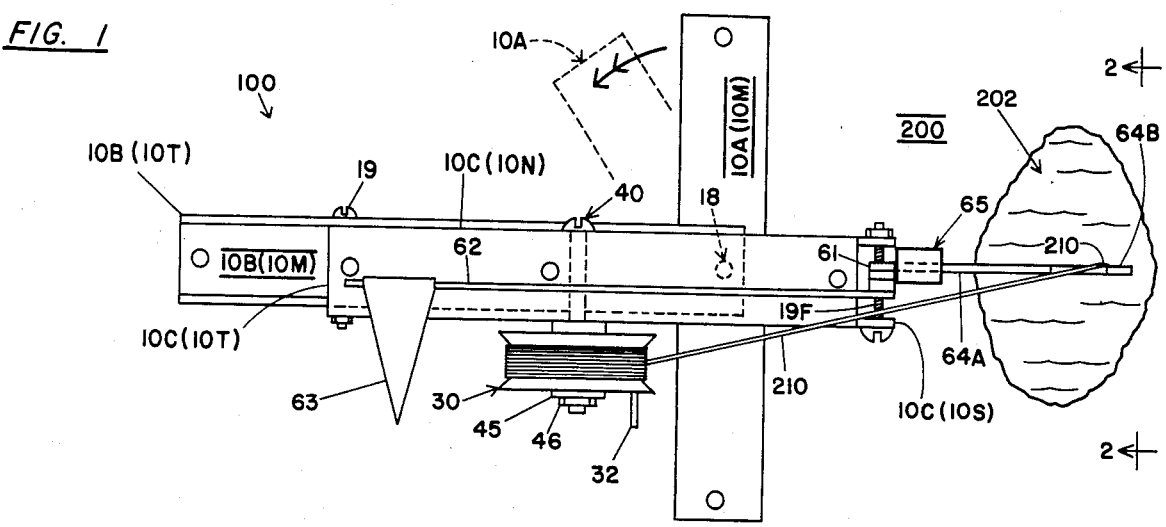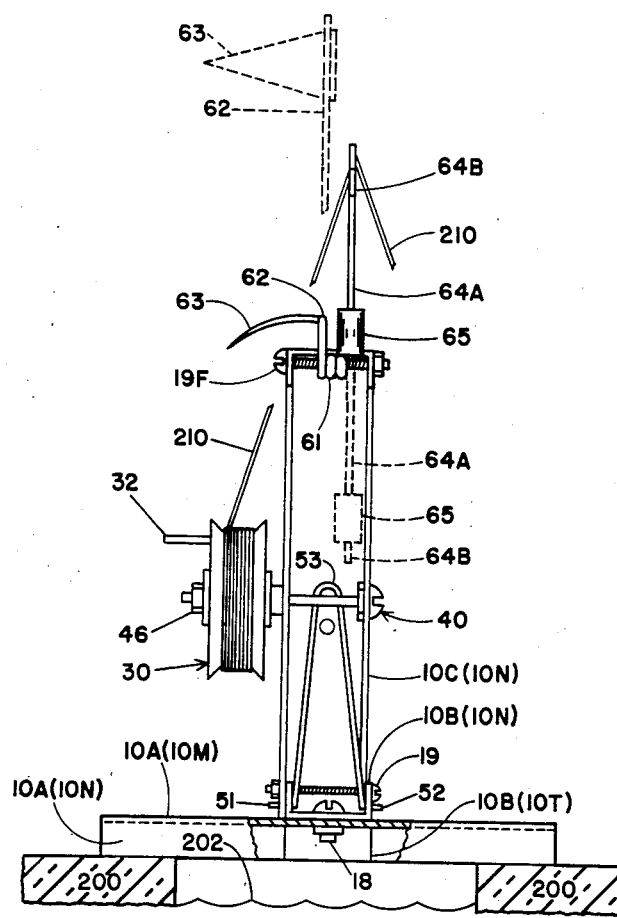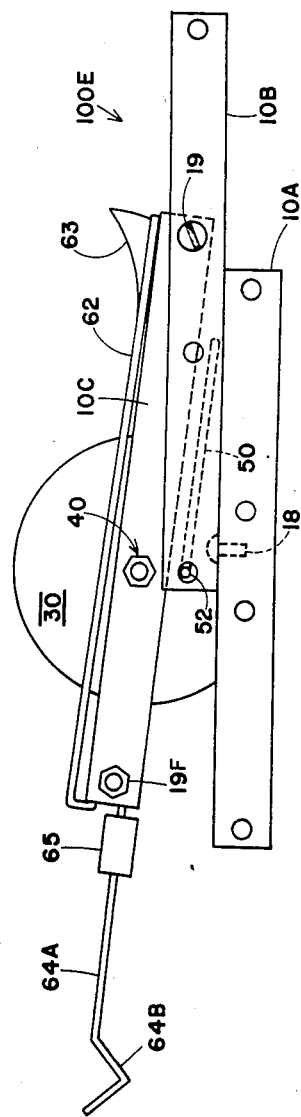

ICE FISHING TIP-UP APPARATUS

BACKGROUND OF THE INVENTION

Wintertime fishermen seeking game fish through ice-crust holes desire ice fishing tip-up apparatus that is readily erectable and operationally reliably at the frigid fishing site, that is compactly nestably transportable between fishing sites or to interim storage, and that is functionally durable throughout frequent usages over several Winter seasons. These desires are repeatedly expressed, though not only actually attainable in all respects, by prior art workers. Even very recent prior art, such as in U. S. Pat. No. 4,567,686 (Akom-2/4/1986), continues to utilize structural components that are unduly expensive and complicated to erect into operational form, that are not operationally reliable under diverse frigid fishing conditions, that are not readily compactly storeable and transportable, and that are not sufficiently durable and repairable over several Winter seasons.

OBJECT OF THE INVENTION

It is accordingly the general objective of the present invention to provide vastly improved ice fishing tip-up apparatus having structural, operational, and servicing advantages that have thus far eluded prior art workers. It is an ancillary general objective to provide ice fishing tip-up apparatus that is readily erectable and operationally reliable at frigid fishing sites,that is of nestable construction for exceedingly compact transportation and storage, and that is durable and readily serviceable over several Winter seasons.

GENERAL STATEMENT OF THE INVENTION

With the above general objectives in view, and together with other ancillary and specific objectives which will become more apparent as this description proceeds, the ice fishing tip-up apparatus of the present invention generally comprises: three structurally interchangeable and uniquely plurally apertured channel members alternatively designatable as alpha-member, beta-member, and gamma-member; the alpha-member and beta-member being adjustably pivotably joined in parallel horizontal planes, and the gamma-member being pivotably joined in an angularly inclinable relationship to the beta-member; an omega-shaped prop member that is pivotably attached to and obscurable within the beta-member, the prop member being capable of engaging an axle or other underlying stop member of the inclined gamma-member; a fishing line reel attached in flanking relationship to the gamma-member with an axle; and an elongate lever that medially surrounds a fulcrum terminus of the gamma-member, one of the two lever arms being a relatively shorter and slidably weighted leadward-arm that abruptly falls whenever a fish is caught at the fishing line, and the other lever arm being a lengthier trailward-arm that abruptly raises in signal-like fashion just as a fish is caught.

BRIEF DESCRIPTION OF THE DRAWING

In the drawing, wherein like characters refer to like parts in the several views, and in which:

FIG. 1 is a top plane view of a preferred embodiment (100) of the ice fishing tip-up apparatus of the present invention;

FIG. 2 is a frontal elevational view of the FIG. 1 embodiment and taken along line 2—2 of FIG. 1;

FIG. 2A is a side elevational view of the preferred embodiment, but in a readily transportable collapsed form (100E);

DETAILED DESCRIPTION OF THE DRAWING

Before making a detailed operational description of ice fishing tip-up apparatus embodiment 100 shown in FIGS. 1 and 2, various salient components of embodiment 100 will be first described in the immediately ensuing paragraphs.

Figure 3:
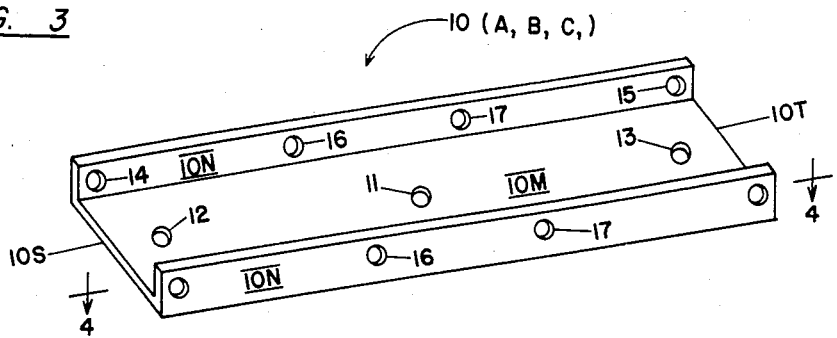
FIG. 3 is a perspective view of one of the three substantially identical nd structurally interchangeable channel member components (10) of preferred embodiment 100.
Figure 4:
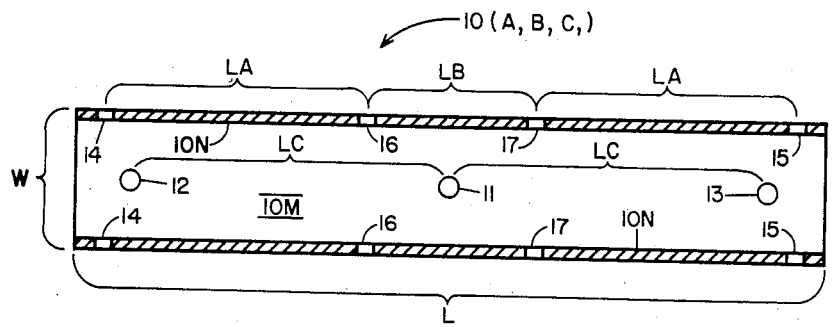
FIG. 4 is a sectional view taken along line 4—4 of FIG. 3.

Drawing FIGS. 3 and 4 refer to three substantially identical and structurally interchangeable channel members 10 and alternatively designatable as an alpha-member 10A, a beta-member 10B, and a gamma-member 10C. Each channel member 10 extends longitudinally between two channel ends including a fore-end 10S and a rear-end 10T. Each channel consists of a planar rectangular base-panel 10M and two planar rectangular side-panels 10N, all three extending the length (L) between the channel terminii 10S and 10T. Base-panel 10M includes a central-opening 11 and desireably also a pair of endward-openings 12 and 13 respectively spaced a longitudinal distance (LC) from central-opening 11. Side-panels 10N, which are transversely spaced at a width (W), extend perpendicularly upwardly from the two lengthwise edges of base-panel 10M. Paired side-panels 10N are perforated in transverse alignment more than once such as: medial-perforations sets 16 and 17 at longitudinal distance (LB) therebetween; and endward-perforations 14 and 15 which flank respective medial-perforations (16, 17) at longitudinal distances (LA). The diameters for circular apertures 11–17 are substantially equal.

FIG. 4 indicates important mathematical ratios among distances W, L, LA, LB, and LC, for channel members 10 having a preferred length (L) of substantially twelve inches.

As stated in two immediately preceeding paragraphs, the three channel members 10 are structurally interchangeable. For example, as initial steps in building the ice fishing apparatus preferred embodiment 100, the assembler first places any one channel member 10) and designatable as alpha-member 10A) upon a planar horizontal surface (e.g. a table, a laminar ice-crust 200, etc.) so that the side-panels 10N downwardly abut such planar surface. Then, the assembler positions one of the two remaining channel members (and designatable as beta-member 10B) so that its base-panel 10M horizontally downwardly abuts a central portion of the alpha-member elevated base-panel. Nut and short-screw fasteners (18) pass through an endward-opening 12 of beta-member 10B and through central-opening 11 of alpha-member 10A to provide a vertical first-pivot (18) therebetween. Thus, the only portion of beta-member 10B that contacts such planar surface (e.g. 200) is its rear-end 10T. Next, the assembler takes the last available channel member (and designatable as gamma-member 10C) and places its downwardly extending side panels 10N parallel alongside the upwardly extending side-panels 10N of beta-member 10B. Nut and long-screw fasteners (19) pass through medial-perforations 17 of beta-member 10B and through endward-perforations 15 of gamma-member 10C to provide a horizontal second-pivot (19). Thus, gamma-member is angularly inclinable from second-pivot 19 so that its fore-end (10S, 19F) is loftily elevatable above said first-pivot 18 and ice-hole 202.

Figure 5:
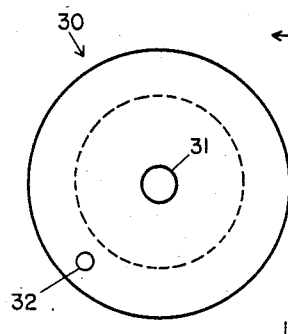
FIG. 5 is a side elevational view of a representative fishing line reel component (30) for embodiment 100.
Figure 6:
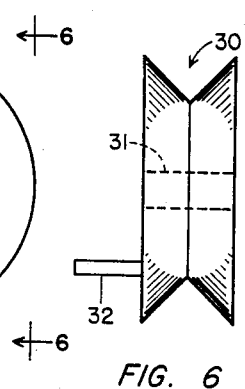
FIG. 6 is a transversely extending elevational view of the FIG. 5 reel and taken along line 6—6 thereof.
Figure 7:
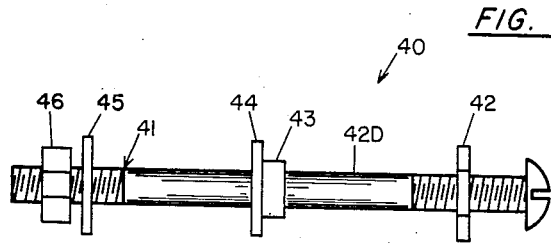
FIG. 7 is tranversely extending elevational view of an axle component (40) for embodiment 100.

As seen in drawing FIGS. 5-7, other salient components include a fishing line reel (30) that is revolvable about a horizontally extending axle (40 extendable through reel central-bore 31. Transversely horizontally extending axle 40 herein comprises an elongate bolt 41 (which is threaded along its terminal lengths) that passes through a medial-perforations set (16) of gamma-member 10C. Thus, the medial-perforations set 17 of gamma-member 10C intervenes between axle 40 and second-pivot 19. A nut (42) secures the headed end of bolt 41 to one side-panel of gamma-member 10C. A spacer-bushing 43 surrounds bolt 41 and abuts the external side of the other gamma-member side-panel. Washers 44 and 45, which surround bolt 41, flank reel 30; another nut 46 threadedly engages bolt 41 and bears against washer 45. The non-threaded central length (42D) occupies the transversely extending space (W) between the gamma-member side-panels, and hence, is adapted to provide one type of stop member at the cross-sectional interior of gamma-member 10C. 32 indicates a hand-crank for reel 30.

Figure 8:
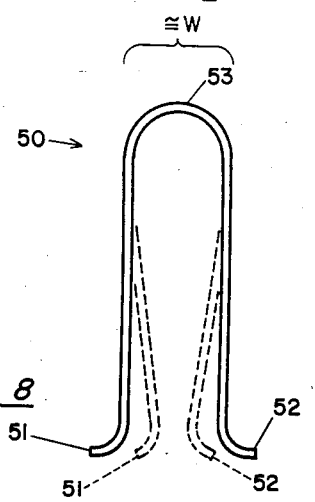
FIG. 8 is a plan view of a prop member (50) for embodiment 100.

Drawing FIG. 8 depicts a preferred embodiment (50) of a prop member that is pivotably attachable to an endward-perforations srt (14) of beta-member 10B and extendable upwardly therefrom to removably engage a stop member (e.g. 42D). Preferred prop member 50 consists of a springy wire bent into an omega-shape. Thus, as indicated in FIG. 8 phantom lines, manual pressure is sufficient to introduce the two transversely extending free-ends (51, 52) into beta-member endward-perforations 14 whereby the zenith 53 of the thusly pivotal prop member 50 is adapted to engage a stop means (e.g. 42D) and establish a finite angular inclination for the reel-carrying gamma-member 10C. Inasmuch as a medial-perforations set 16 of beta-member 10B intervenes between pivot 51-52 and second-pivot 19, prop member 50 is storeable within beta-member 10B whenever embodiment 100 is in the downwardly collapsed interim storage condition (100E).

Figure 9:
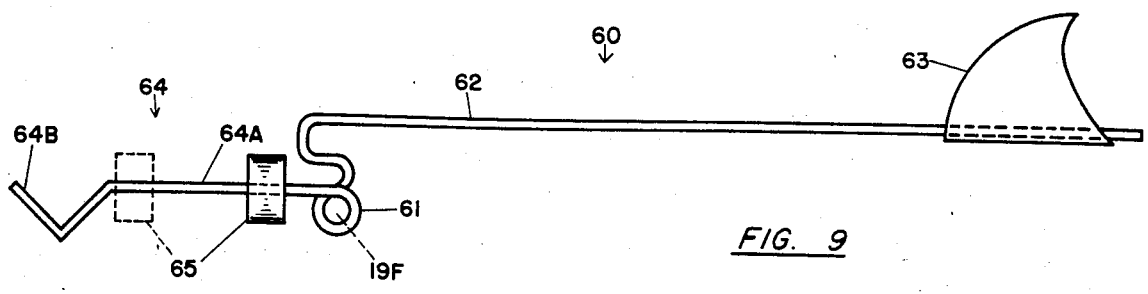
FIG. 9 is a plane view of a longitudinally extending lever member (60) for embodiment 100.

FIG. 9 depicts a preferred embodiment (60) for an elongate lever member that predominately comprises an elongated wire permanently bent into: a helically tubular medial-portion 61 (adapted to rotatably surround a fulcrum mebmer 19F); a relatively lengthy linear trailward-arm 62; and a relatively shorter leadward-arm 64 having a first-length 64A offset from trailward-arm 62 and extending linearly from helix 61 and having a crooked second-length 64B which might have a terminal eyelet. A weight 65 slidably surrounds the linear first-length (64A) only of leadward-arm 64. Remote from helical medial-portion 61, trailward-arm 62 is provided with a flag (63) or other visual indicator means. A said fulcrum member (19F) might be provided by passing a twin of nut and long-screw fasteners (19) through endward-perforations 14 of gamma-member 10C.

The paragraphs hereabove having described all the components (and including their structural inter-relationships) necessary for the fabrication of ice fishing preferred embodiment 100, the reader's attention is now brought to the FIGS. 1 and 2 assembly and operational views of erected embodiment 100.

In embodiment 100, pivotal prop member 50 is erect and its apex 53 is abuttably beneath axle stop means (40, 42D) of pivotal (19) gamma-member 10C whereby gamma-member 10C is upwardly inclined at a range of 30° to 60° with respect to beta-member 10B and to ice-crust 200. Inasmuch as lever member trailward-arm 62 lies along the gamma-member base-panel, both said trailward-arm and co-parallel first-length 64A are positioned at similar upward angular inclinations with respect to beta-member 10B and to ice-crust 200. In this condition, lever member slidable weight 65 is gravitationally held against lever member helical medial-portion 61. A flexible fishing line 210 extends from reel 30 to the lever member second-length 64B and thence downwardly into ice-hole 202. Whever a fish is caught within ice-hole 202, the caught fish pulls downwardly on fishing line 210 and lever second-length 64B whereby slidable weight 65 proceeds along linear first-length 64A until it reaches crooked second-length 64B. When this occurs, and as indicated in FIG. 2 phantom lines, lever leadward-length 64-65 abruptly falls and lever trailward-length 62-63 coincidentally abruptly raises to alert the fisherman that a fish has been caught. Then, after the caught fish is landed, the fisherman re-sets lever 60 to the normal "ready" condition indicated by solid lines in FIGS. 1 and 2.

Drawing FIG. 2A indicates the readily transportable, storeable, and re-erectable mode 100E of embodiment 100 wherein:

(a) as indicated by the double-headed curved arrow of FIG. 1, alpha-member 10A is pivoted at first-pivot 18 into co-directional paralellism with beta-member 10B;

(b) pivotal prop member 50 is dis-engaged from axle stop means 40 and is obscured within the channeled interior of beta-member 10B. Thus, gamma-member 10C automatically pivots at second-pivot 19 and becomes co-directionally parallel with beta-member 10B;

(c) lever member 60 becomes substantially co-directionally parallel with channel members 10A, 10B, and 10C; and (d) fishing line reel 30 lies alongside the co-directionally parallel channels 10A, 10B, and 10C, and lever arms 62 and 64.

From the foregoing, the construction and operation of the ice fishing tip-up apparatus concept of the present invention will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. Readily erectable, operationally reliable, and nestably transportable ice fishing tip-up apparatus comprising:

(A) three substantially identical and structurally interchangeable elongate channel members and alternatively designatable as an alpha-member, a beta-member, and a gamma-member, each channel member extending longitudinally between two ends including a fore-end and a rear-end and comprising:

(Aa) an elongate planar rectangular base-panel having a central-opening therethrough, (Ab) a pair of elongate and transversely spaced planar side-panels coextensive along and extending perpendicularly upwardly from the two lengthwise extremities of said rectangular base-panel, said paired side-panels being perforated in transverse alignment more than once including a medial-perforations set located substantially midway the channel member ends and also including an endward-perforations set located nearer to a said channel end than to a medial-perforations set, (Ac) a designatable alpha-member having its side-panels extending downwardly from its base-panel whereby said base-panel is elevatable above a laminar ice-crust by the side-panels thereof, (Ad) a designatable beta-membr having its side-panels extending upwardly from its base-panel, the beta-member base-panel immediately adjacent to a channel end downwardly abutting a central portion of the alpha-member base-panel, and a first-pivot vertically passing through the alpha-member base-panel central-opening and the abutting base-panel of said overlying beta-member whereby said beta-panel is adapted to contact said laminar ice-crust at that end remote from the first pivot, (Ae) a designatable gamma-member having its side-panels extending downwardly from its base-panel and respectively extending alongside medial portions of the beta-member side-panels, and a second-pivot horizontally extending through a medial-perforations set of beta-member and through the gamma-member side-panels whereby an end of said gamma-member channel is loftily elevatable above said vertical first-pivot, and (Af) a stop member carried by said gamma-member below the base-panel thereof and remote from said second-pivot;

(B) a prop member pivotably attached to an endward-perforations set of beta-member and extendable upwardly therefrom to removably engage said stop member and establish a finite angular inclination for said gamma-member channel;

(C) a fishing line reel attached in flanking relationship to a medial portion of said gamma-member with a horizontally extending axle;

(D) a horizontally extending fulcrum member extending through an endward-perforations set of the elevatable end of said gamma-member; and (F) an elongate lever member including:

(Fa) a tubular medial-portion revolvably surrounding said fulcrum member, (Fb) a relatively lengthy linear trailward-arm extending along and downwardly abutting the gamma-member base-panel, said trailward-arm being provided with a visual signal means, (Fc) a relatively shorter leadward-arm having a first-length extending linearly from said fulcrum member and having a crooked second-length terminus adapted to overlie an ice fishing hole, and (Fd) a weight member slidably surrounding said lever first-length.

2. The ice fishing apparatus of claim 1 wherein the prop member is of substantially omega-shaped configuration and has its two free-ends pivotably engaged with an endward-perforations set of the beta-member channel.

3. The ice fishing apparatus of claim 1 wherein said horizontally extending axle member extends through a medial-perforations set of said gamma-member side-panels and thereby also provides a said stop member.

4. The ice fishing apparatus of claim 3 wherein each of the elongate channels at the side-panels thereof has two longitudinally separated sets of endward-perforations; and wherein the second-pivot extends through an endward-perforations set of the beta-member.

5. The ice fishing apparatus of claim 4 wherein each of the elongate channels at the side-panels thereof has two sets of medial-perforations that are closer to each other than to either endward-perforations set; wherein a medial-perforations set of the beta-member intervenes between the first-pivot and the second-pivot; and wherein a medial-perforations set of the gamma-member intervenes between the second-pivot and the axle member.

6. The ice fishing apparatus of claim 5 wherein the prop member is a springy wire of omega-shaped configuration and has its two free-ends pivotably extending through an endward-perforations set of the beta-member channel.

7. The ice fishing apparatus of claim 6 wherein each of the elongate channels at the base-panels has two endward-openings therethrough; and wherein the first-pivot extends through an endward-opening of the beta-member.

8. The ice fishing apparatus of claim 7 wherein the reel is provided with a horizontally extending crank that is offset from the horizontal axle for said reel.

9. The ice fishing apparatus of claim 8 wherein the first-pivot and the second-pivot respectively comprise headed fasteners threadedly engaged with nuts against the channels whereby selected pivotal relationship among the three channel members might be alternatively fortified and released.

10. The ice fishing apparatus of claim 6 wherein the omega-shaped prop member is pivotably downwardly obscurable within the beta-member whereby the first-pivot, the second-pivot, and the fulcrum member of the apparatus provide a collapsed transportable storeable mode wherein the fishing line reel lies alongside three co-directionally parallel channel members and also the lever member tailward-arm.

* * * * *